United States Patent [19]

Bois et al.

[11] Patent Number: 4,861,131
[45] Date of Patent: Aug. 29, 1989

[54] DISPLACEMENT TRANSDUCER WITH STAGGERED OPTICAL FIBRES

[75] Inventors: Emmanuel Bois, Massy; Serge Huard, Aubagne; Gilbert Boisde, Bures sur Yvette, all of France

[73] Assignees: Sick-Optique-Electronique, Emerainville; Commissariat a l'Energie Atomique, Paris, both of France

[21] Appl. No.: 190,058

[22] Filed: May 4, 1988

[30] Foreign Application Priority Data

May 11, 1987 [FR] France ................. 87 06577

[51] Int. Cl.$^4$ .............................. G02B 6/32
[52] U.S. Cl. ........................... 350/96.18; 250/227; 350/96.29
[58] Field of Search ............. 350/96.18, 96.29; 250/227

[56] References Cited

U.S. PATENT DOCUMENTS 4,249,076 2/1981 Bergstrom et al. ......... 250/231 R X
4,325,638 4/1982 Takeda et al. ................. 250/227 X
4,488,813 12/1984 Kissinger et al. .................. 356/375
4,737,624 4/1988 Schwarte ....................... 250/227 X

FOREIGN PATENT DOCUMENTS 3619923 8/1987 Fed. Rep. of Germany .
455304 9/1963 Switzerland .

OTHER PUBLICATIONS

Abstract of Japanese Patent No. 60,162,903 (Jiyapan Sensaa Corporation K.K.)

Primary Examiner—John D. Lee
Assistant Examiner—Phan T. Heartney
Attorney, Agent, or Firm—Pearne, Gordon, McCoy & Granger

[57] ABSTRACT

It comprises an optical system, two optical fibres on either side of the optical axis of the optical system and longitudinally stagered along said axis and, for each fibre, injecting light into the fibre and detecting the light emerging from the fibre following reflection on an object, the latter being positioned facing the optical system. Electronic processing of the signals supplied by the detector to determine the displacement of the object relative to the optical system and possibly the distance between the object and the optical system.

The system has application to the inspection of mechanical parts.

6 Claims, 3 Drawing Sheets

DISPLACEMENT TRANSDUCER WITH STAGGERED OPTICAL FIBRES

DESCRIPTION

The present invention relates to a displacement transducer with staggered optical fibres. It more particularly makes it possible to determine the displacement of an optically reflecting object relative to said transducer and more specifically applies to the inspection of mechanical parts. Optical transducers making it possible to carry out displacement measurements are known, but they use complicated interferometric methods.

The present invention aims at obviating this disadvantage.

The invention relates to an optical transducer for determining the longitudinal displacement, relative to said transducer, of an object reflecting optically in a given range of optical wavelengths, said transducer comprising:

an optical system, the object being positioned facing one face of said optical system, a first and a second optical fibre being at a predetermined distance with respect to the optical system and located on either side of the optical axis of said optical system and whereof the respective ends are positioned facing the other face of the optical system and are longitudinally staggered along said optical axis, first means for emitting light of a wavelength belonging to said range and for injecting said light into the other end of the first optical fibre with a view to supplying it to the object via the optical system, first means for the recovery of light and for detecting the light returned to the other end of the first fibre after reflection on the object, the first detection means then supplying a first electric signal, second means for emitting light of a wavelength belonging to said range and for injecting said light into the other end of the second fibre with a view to supplying it to the object via the optical system, second means for the recovery of light and for the detection of light returned to the other end of the second fibre after reflection on the object, the second detection means then supplying a second electric signal and electronic means for the processing of said first and second signals for determining on the basis of the latter the displacement of the object relative to the optical system.

The transducer according to the invention makes it possible to perform contactless displacement measurements, which can be extremely accurate. To this end it uses photometric methods which are much simpler than interferometric methods.

According to a preferred embodiment of the transducer according to the invention, the displacement z of the object relative to the optical system is determined by the following optical formulas:

$$r.z. = (A - B)/(A + B)$$

$$A = \phi 1/\phi 10$$

$$B = \phi 2/\phi 20$$

r being a proportionally constant, $\phi 1$ and $\phi 10$ respectively designating the light fluxes received at the other end of a first fibre for an object at a distance D and an object at a distance S1 with: D=z+S1 and S1=(S11+S12)/2, S11 and S12 respectively designating the distances from the optical system to the respective image planes of the ends of the first and second fibres through the optics and $\phi 2$ and $\phi 20$ respectively designating the light fluxes received at the other end of the second fibre for an object at said distance D and an object at said distance S1.

The electronic processing means can also determine the distance D from z and S1.

According to a particular embodiment of the transducer according to the invention, the first emission means modulate the intensity of the light corresponding thereto at a first frequency, the first detection means performing a synchronous detection of said light having an intensity modulated in this way, the second emission means modulating the intensity of the light corresponding thereto at a second frequency differing from the first frequency and the second detection means perform a synchronous detection of said light, whose intensity is modulated at the second frequency.

According to another embodiment, the first and second emission means respectively emit lights, whose intensities are modulated and are in phase opposition and the first and second detection means perform a synchronous detection of the lights respectively emitted by the first and second emission means.

Finally and advantageously, the transducer according to the invention can also comprise means for displacing the optical system parallel to its optical axis, so that it is possible to regulate the focusing of the optical system. This, linked with the possibility of changing the optical system, makes it possible to adjust both the detection distance D and the accuracy of the measurements.

The present invention will be better understood from reading the following description of exemplified embodiments given in a purely illustrative and non-limitative manner with reference to the attached drawings, wherein:

FIG. 1 diagrammatically shows an optical fibre autocollimated via an optical system and an optically reflecting object.

Figure 1:
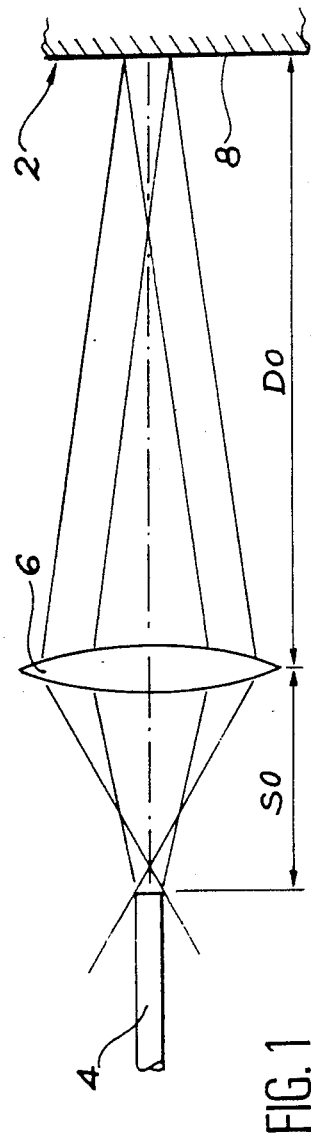

FIG. 1 diagrammatically shows an object 2 optically reflecting in a known optical wavelength range, an optical fibre 4 and an optical system 6. One end of the fibre faces one face of the optical system and the axis of a portion of the fibre extending from said end essentially coincides with the optical axis of optical system 6. The object faces the other face of the optical system and has a planar optically reflecting surface 8 substantially perpendicular to said optical axis.

At the other end of the fibre is injected light, whose wavelength belongs to said range. The optical system, which can be a thin or thick convergent lens focuses said light onto said surface of the object on which it is reflected in order to then pass again into the fibre after retraversing the optical system (autocollimation).

The fibre collects a light maximum when the following relation is proved, assuming that the optical system is a thin convergent lens:

$$(1/S0)+(1/D0)=1/F \quad (1)$$

in which S0 and D0 respectively represent the distance between the end of the fibre and the lens and the distance between the latter and the surface of the object.

In relation (1), the quantity F represents the focal distance of the lens. This relation, valid for a thin convergent lens, is also valid for any convergent optical system of focal distance F, then considering that S0 represents the distance between the end of the fibre and the object principal plane of the optical system and D0 the distance between the image principal plane and said surface of the object.

When relation (1) is proved, the fibre is perfectly self-conjugate by the set optical system-reflecting surface-optical system, even if said fibre portion is not located on said optical axis.

On now considering the object at a distance D from the optical system (or more precisely the image principal plane thereof), the light flux $\phi$ received at said other end of the fibre, following light reflection on the said surface of the object is a function of D, which passes through a maximum when D is equal to D0.

When D is close to D0, the following approximation applies:

$$\phi(x)=\phi(0).(1-Ax^2) \quad (2)$$

in which A is a constant and x is D-D0.

Figure 2:
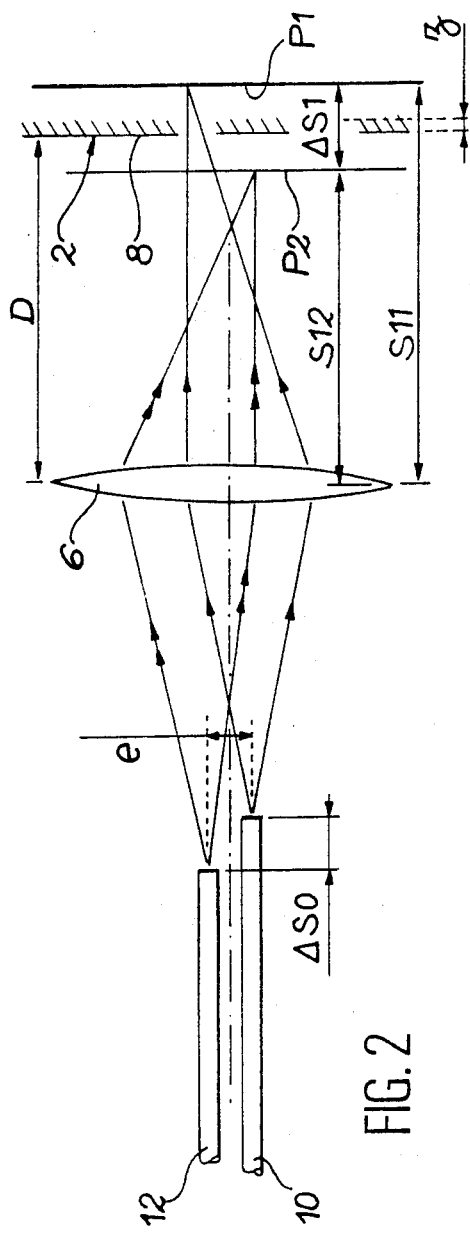
FIG. 2 is a diagrammatic view of part of a transducer according to the invention.

FIG. 2 diagrammatically shows part of a transducer according to the invention for determining the distance D between the planar surface 8 of the object 2 and the lens 6 on the basis of the measurement of an object displacement z, to which reference will be made hereinafter.

Apart from lens 6, the transducer comprises a first optical fibre 10 and a second optical fibre 12. These two fibres are parallel and located on either side of the optical axis of the lens facing said face of the optical system. The distance between the axes of the fibres is designated e.

The respective ends of the fibres, which face said face of the lens, are longitudinally staggered by a length $\Delta S0$ parallel to the optical axis of the lens (to which the fibres are parallel), the end of the fibre 10 being closer to lens 6 then the end of fibre 12.

On designating by S11 the distance between lens 6 and the image plane P1 of the first fibre 10 through the lens and by S12 the distance between the lens and the image plane P2 of the second fibre 12 through the lens, it is possible to write:

$$\Delta S1 = S12 - S11 = -(\Delta S0).F^{-2}.(S1-F)^2 \quad (3)$$

with $S1=(S12+S11)/2$. This formula (3) results from the application of a formula of type (1) to each of the fibres 10,12, which would be in perfect autocollimation if the planar surface 8 of the object coincided with the relative image plane to said fibre. On the setting $z=D-S1$ (z being the considered displacement of the object) and $\delta=-\frac{1}{2}\Delta S1$, the following approximation can be made for z close to 0 and by using a formula of type (2) for the light flux $\phi1(z)$ intercepted by the first fibre 10 and due solely to the light flux emitted by said fibre (whilst injecting at its other end a light which is then reflected on the object in order to be reinjected into said end of the fibre 10):

$$\phi1(z)=\phi1(0).(1-A1(z+\delta)^2) \quad (4)$$

In the same way the following approximation can be made for z close to 0 and using a formula of type (2) for the light flux $\phi2(z)$ intercepted by the second fibre 12 and due solely to the light flux emitted by said fibre 12 (whilst injecting at its other end a light which is then reflected on the object to be reinjected into said end of the fibre 12):

$$\phi2(z)=\phi2(0).(1-A2(z-\delta)^2) \quad (5)$$

the quantities A1 and A2 being constants.

By respectively designating by $\rho1(z)$ and $\rho2(z)$ the quantities $\phi1(z)/\phi1(0)$ and $\phi2(z)/\phi2(0)$, it is possible to write for z close to 0;

$$(\rho1(z)-\rho2(z))/(\rho1(z)+\rho2(z))=a0+a1.z+a2.z^2 \quad (6)$$

a0, a1 and a2 being constants.

However, it has been found that the quantities a0 and $a2.z^2$ are negligible compared with $a1.z$. More specifically, it is possible to write:

$$r.z=(\rho1(z)-\rho2(z))/(\rho1(z)+\rho2(z)) \quad (7)$$

around $z=0$ in a range a few millimeters wide, particularly for $\Delta S0=1$ mm and $F=20$ mm by more simply designating r the constant a1.

Figure 3:
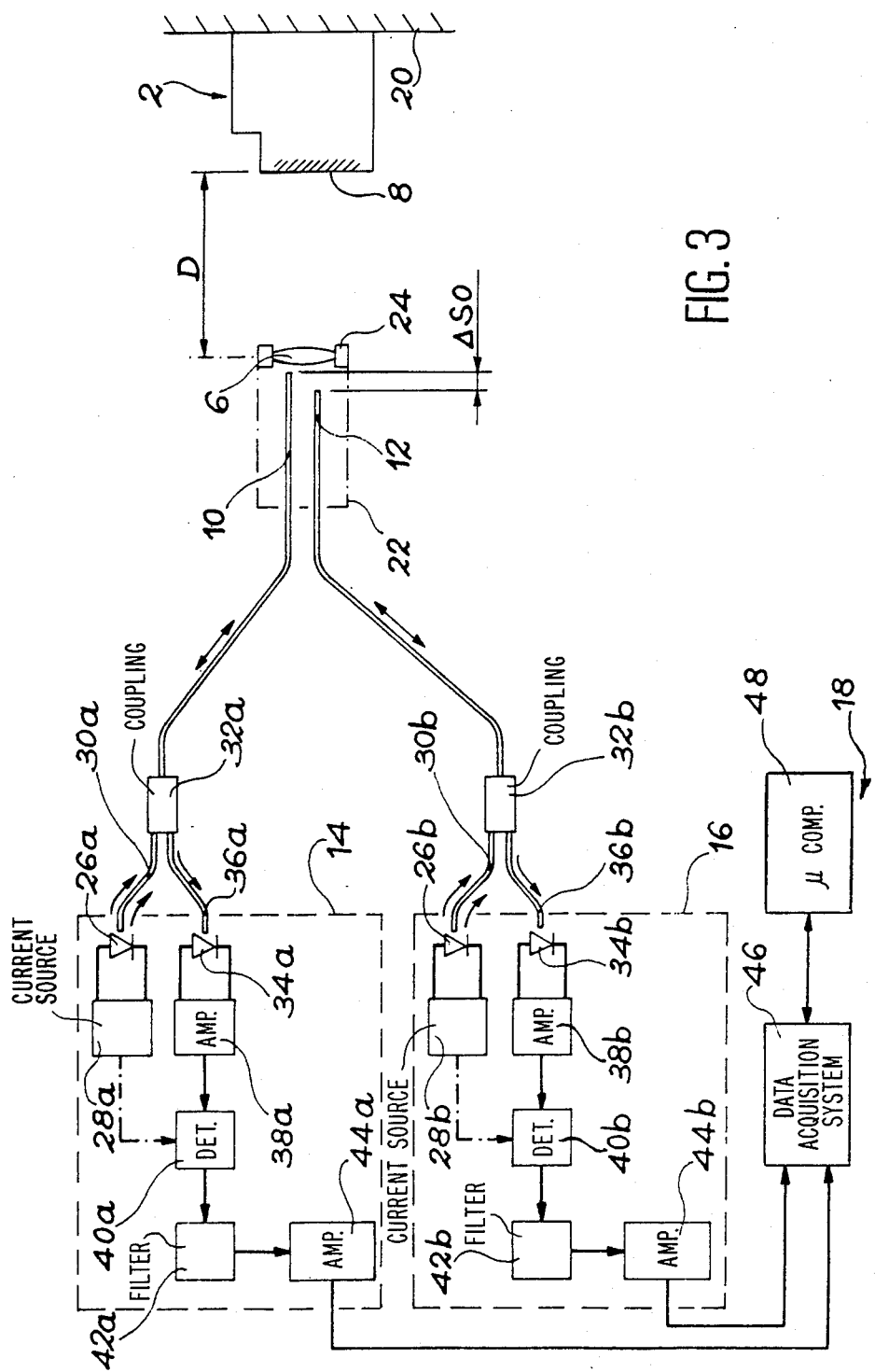
FIG. 3 is a diagrammatic view of a particular embodiment of the transducer according to the invention.

FIG. 3 diagrammatically shows a particular embodiment of the transducer according to the invention. Apart from the aforementioned fibres 10,12 and optical system 6, it comprises light transmission-reception means 14 associated with the first fibre 10, light transmission-reception means 16 associated with the second fibre 12 and electronic processing means 18.

Object 2, whereof the surface 8 is at a distance D from the lens 6, rests by another surface parallel to said surface 8 against a planar support 20, whereof the distance to the optical system 6 is determined prior to the measurement.

The portions of fibres 10 and 12 extending respectively from said ends of the fibres are parallel to the optical axis of the lens on either side of said axis and displaced with respect to one another in accordance with said axis and are e.g. fixed in not shown capillary tubes, which are themselves fixed in a support tube 22, whose axis coincides with said optical axis and which constitutes the "measuring head" of the transducer. Lens 6 is placed at one end of the support tube 22, provided with a lens mount 24 permitting a displacement of lens 6 parallel to its optical axis.

The transmission-reception means 14 or 16 comprise a light-emitting diode 26a or 26b, which is controlled by an appropriate current source 28a or 28b, so that the intensity of the light emitted by the diode is modulated.

The modulation frequencies differ for diodes 26a and 26b and are e.g. respectively 10 and 12 kHz.

The light emitted by diode 26a and 26b is transmitted to the other end of the fibre 10 or 12 via an optical fibre 30a and 30b and an optical coupling means 32a or 32b.

The light which emerges from the other end of fibre 10 or 12 (after reflection on surface 8) reaches a detection photodiode 34a or 34b via coupling means 32a and 32b and an optical fibre 36a or 36b. The optical coupling means 32a or 32b can comprise a beam splitter or a Y coupler.

Photodiode 34a or 34b is coupled to a preamplification circuit 38a or 38b. The signal supplied by the photodiode is amplified by said circuit 38a or 38b and is supplied to the input of synchronous detection means 40a or 40b synchronized with source 28a or 28b.

By using two modulation frequencies respectively adjusted to two different values, it is possible to obtain at the output of the synchronous detection means 40a or 40b an amplified signal only corresponding to the signal emitted by the associated diode 26a or 26b.

The analog output signal of the synchronous detection means 40a or 40b is then filtered by a low-pass filter 42a or 42b, in order to eliminate the high parasitic frequencies and is then amplified by an amplifier 44a or 44b.

The electronic processing means 18 comprise a data acquisition system 46 controlled by a microcomputer 48. As a non-limitative example, system 46 is of type HP 3421 and microcomputer 48 of type HP 86, both marketed by Hewlett Packard.

The analog signals from amplifiers 44a and 44b respectively correspond to the light fluxes $\phi 1(z)$ and $\phi 2(z)$ and are supplied to the system 46, which thus permanently acquires said signals. The prior supply to the microcomputer 48 of quantities S1, r, $\phi 1(0)$ and $\phi 2(0)$, enables it to calculate the ratio R:

$$(\rho 1(z) - \rho 2(z))/(\rho 1(z) + \rho 2(z)).$$

By dividing said ratio by r, the microcomputer can consequently determine the displacement z and by adding S1 to the result obtained also the distance D.

The prior determination of the quantities S1, r, $\phi 1(0)$ and $\phi 2(0)$ is carried out by effecting a relative displacement of object 2 with respect to the measuring head 22, so that the variation $\phi 1(z)$ and $\phi 2(z)$ are obtained as a function of D. From these are deduced the respective maxima $\phi 1(0)$ and $\phi 2(0)$ of $\phi 1(z)$ and $\phi 2(z)$. It is then possible to calculate $\rho 1(z)$ and $\rho 2(z)$ as a function of D and then the ratio R. The value of D for which R is zero and which is in fact S1 (z=0) is then calculated. The quantity r is the absolute value of the slope of the line representing the variations of R as a function of D. These quantities are stored in the microcomputer and serve as a reference for the transducer.

Figure 4:
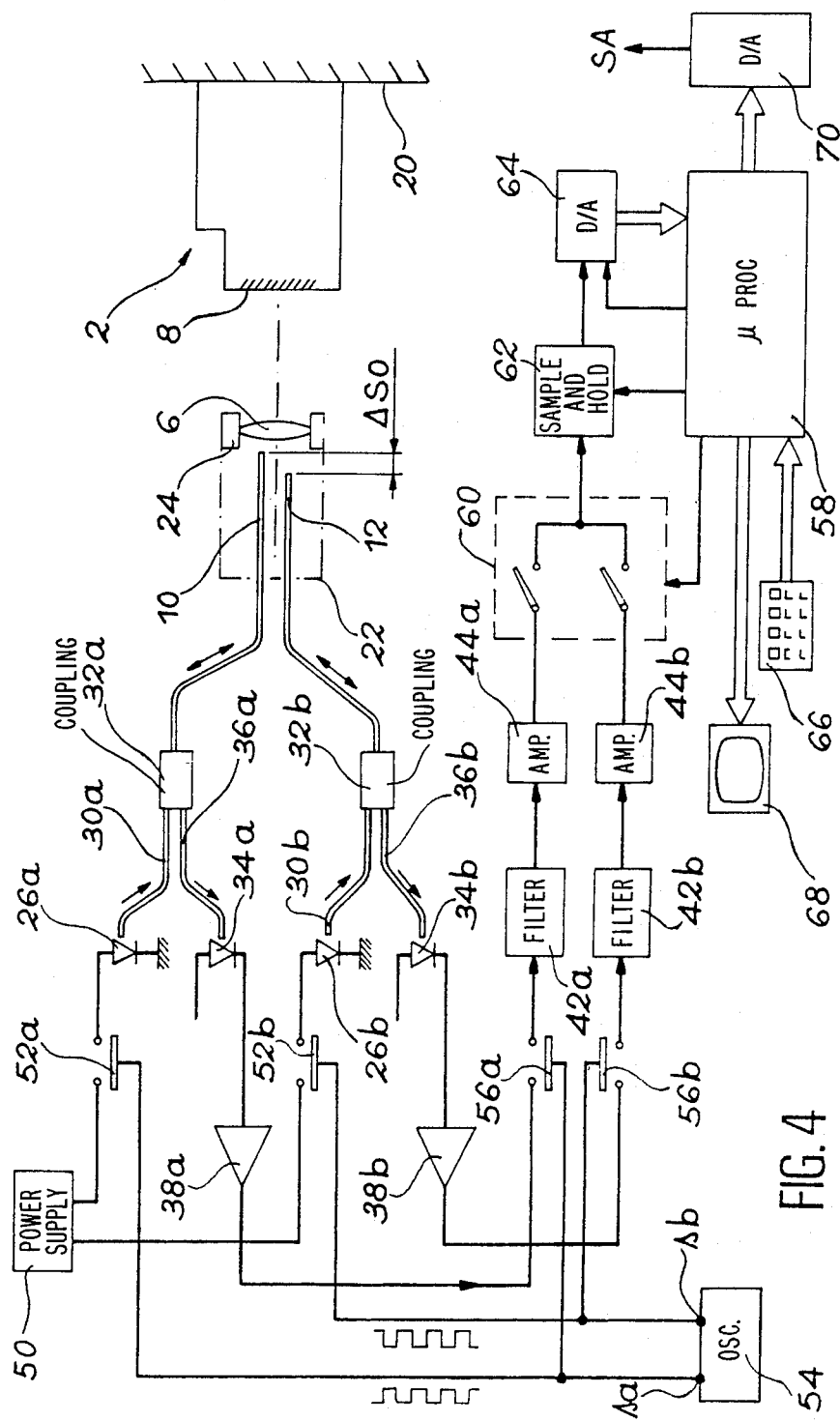
FIG. 4 is a diagrammatic view of another embodiment of said transducer.

FIG. 4 diagrammatically shows another embodiment of the transducer according to the invention. Elements 6, 10, 12, 22, 24, 26a, 26b, 30a, 30b, 32a, 32b, 34a, 34b, 36a and 36b are common to the constructions shown in FIGS. 3 and 4.

Diodes 26a and 26b are controlled by the same power supply 50, respectively via switches 52a and 52b. The latter are respectively controlled by two outputs sa, sb in phase opposition, e.g. of a frequency 10 kHz oscillator 54.

The outputs of the preamplifiers 38a and 38b (which amplify the signals respectively supplied by photodiodes 34a and 34b) are respectively connected to filters 42a and 42b across switches 56a and 56b, which are respectively controlled by outputs sa and sb of oscillator 54. On the basis of the output signals of filters 42a and 42b, amplifiers 44a and 44b supply analog voltages, which can be between 0 and 10 V.

The transducer shown in FIG. 4 is controlled by a microprocessor 58, e.g. of INTEL type 8085. This microprocessor acquires the output signals of amplifiers 44a and 44b (respectively corresponding to quantities $\phi 1(z)$ and $\phi 2(z)$), successively via a two-channel multiplexer 60, a sample and hold circuit 62 and an analog-digital converter 64.

Multiplexer 60 permits the acquisition of one channel after the other by the microprocessor and circuit 62 stores the analog value corresponding to the thus acquired channel for sufficient time to enable converter 64 to convert it into digital form.

Microprocessor 58 is also associated with a keyboard 66, which permits initializations for display means 68 of the measurement results and possibly an analog output SA via a digital-analog converter 70. As hereinbefore, microprocessor 58 calculates the ratio:

$$(\rho 1(z) - \rho 2(z))/(\rho 1(z) + \rho 2(z))$$

divides it by r to obtain the displacement z and adds S1 to the result obtained to obtain D.

We claim:

1. An optical transducer for determining the longitudinal displacement, relative to said transducer, of an object reflecting optically in a given range of optical wavelengths, said transducer comprising:
   an optical system, the object being positioned facing one face of said optical system,
   a first and a second optical fibre being at a predetermined distance with respect to the optical system and located on either side of the optical axis of said optical system and whereof the respective ends are positioned facing the other face of the optical system and are longitudinally staggered along said optical axis,
   first means for emitting light of a wavelength belonging to said range and for injecting said light into the other end of the first optical fibre with a view to supplying it to the object via the optical system,
   first means for the recovery of light and for detecting the light returned to the other end of the first fibre after reflection on the object, the first detection means then supplying a first electric signal,
   second means for emitting light of a wavelength belonging to said range and for injecting said light into the other end of the second fibre with a view to supplying it to the object via the optical system,
   second means for the recovery of light and for the detection of light returned to the other end of the second fibre after reflection on the object, the second detection means then supplying a second electric signal and
   electronic means for the processing of said first and second signals for determining on the basis of the latter the displacement of the object relative to the optical system.

2. A transducer according to claim 1, wherein the displacement z of the object relative to the optical system is determined by the following optical formulas:

$$r.z. = (A - B)/(A + B)$$

$$A = \phi 1/\phi 10$$

$$B = \phi 2/\phi 20$$

r being a proportionality constant, $\phi 1$ and $\phi 10$ respectively designating the light fluxes received at the other end of the first fibre for an object at a distance D and an object at a distance S1 with: D=z+S1 and S1=(S11+S12)/2, S11 and S12 respectively designating the distances from the optical system to the respective image planes of the ends of the first and second fibres through the optics and $\phi_2$ and $\phi_{20}$ respectively designate the light fluxes received at the other end of the second fibre for an object at said distance D and an object at said distance S1.

3. A transducer according to claim 2, wherein the electronic processing means also determine the distance D on the basis of z and S1.

4. A transducer according to claim 1, wherein the first emission means modulate the intensity of the light corresponding thereto at a first frequency, the first detection means performing a synchronous detection of said light whose intensity is thus modulated, the second emission means modulating the intensity of the light corresponding thereto at a second frequency differing from the first frequency and wherein the second detection means perform a synchronous detection of said light whose intensity is modulated at the second frequency.

5. A transducer according to claim 1, wherein the first and second emission means respectively emit lights, whose intensities are modulated and are in phase opposition and wherein the first and second detection means perform a synchronous detection of the lights respectively emitted by the first and second emission means.

6. A transducer according to claim 1, wherein it also comprises means for displacing the optical system parallel to its optical axis.

* * * * *